Dec. 12, 1950     C. M. LEE ET AL     2,533,478
TEMPERATURE COMPENSATING MEANS FOR LENS MOUNTS
Filed Aug. 13, 1947     2 Sheets-Sheet 1
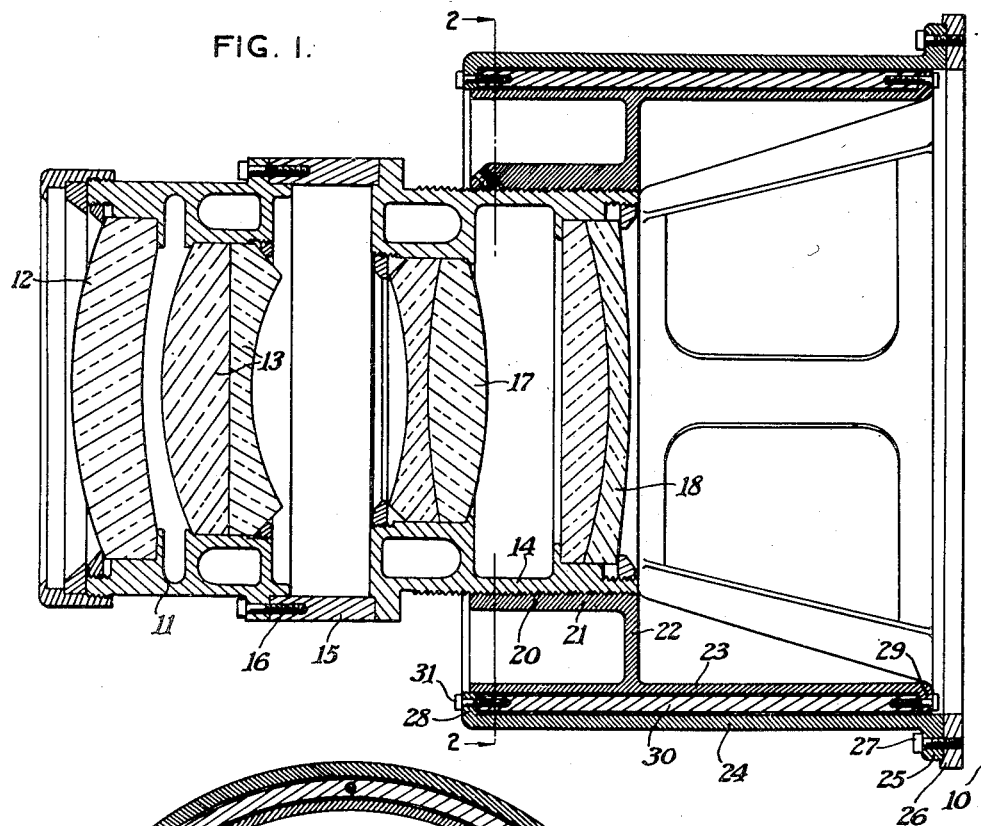
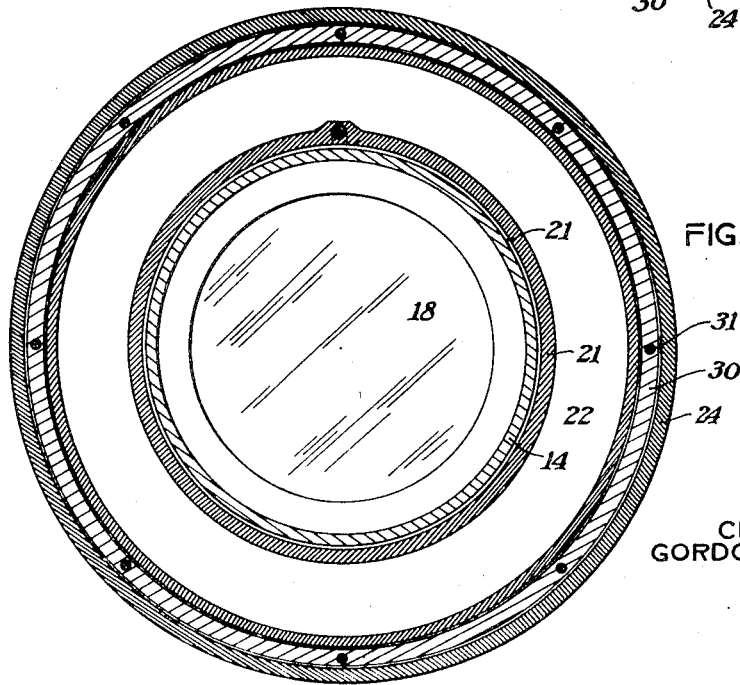
CHARLES M. LEE
GORDON L. BARRINGER
INVENTORS

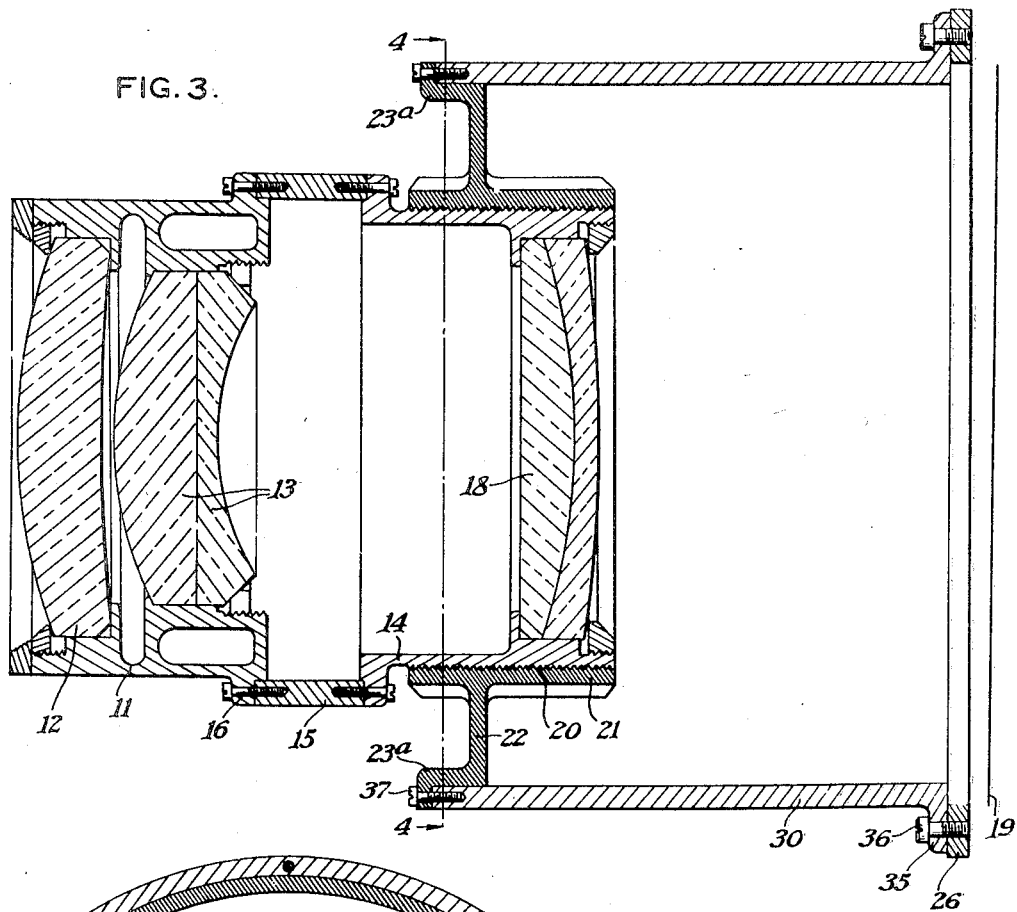
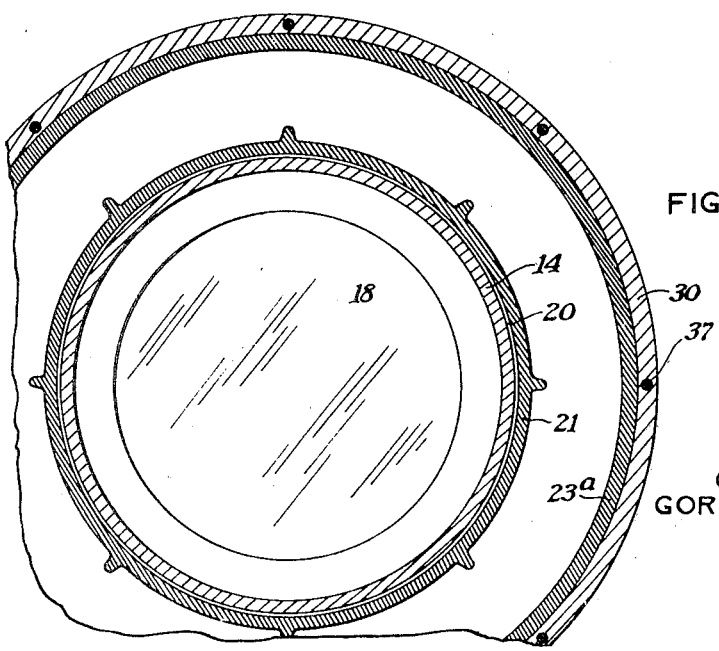

Patented Dec. 12, 1950

2,533,478

UNITED STATES PATENT OFFICE 2,533,478

TEMPERATURE COMPENSATING MEANS FOR LENS MOUNTS

Charles M. Lee and Gordon L. Barringer, Rochester, N. Y., assignors to Eastman Kodak Company, Rochester, N. Y., a corporation of New Jersey Application August 13, 1947, Serial No. 768,352

13 Claims. (Cl. 88—57)

The present invention relates to lens mounts, and more particularly to lens mounts for aviation cameras.

It is well known that the focal length of a lens or lens system will vary with changes in temperature. In some systems, the focal length will decrease with a temperature rise, while in other systems a rise in temperature is accompanied by an increase in the focal length. However, in small cameras having small lenses and used under normal conditions, variation in the focal length of the lenses because of temperature change is not serious and can be neglected. But, in aerial cameras which use large lenses which are subjected to extreme temperature variations, the change in focal length is of considerable consequence; and, in order to produce the desired results, each change in focal length must be considered and some adjustment or compensation made therefore. In some cases, the lens mount and adjacent camera parts are heated so as to maintain the lens or lens system at a definite temperature, or at least to hold the temperature within a definite temperature range.

The present invention accomplishes the focal adjustment without the use of a heating means, and has as its principal object the provision of an aerial lens mount which is so designed that variations in the focus of the lens or lens system caused by changes in temperature are compensated for automatically by a mechanism incorporated within the mount itself.

A still further object of the invention is the provision of a compensating mechanism which not only moves the lens system the proper amount but also in the correct axial direction to adjust the focus properly for the specific temperature conditions encountered.

A further object of the invention is the provision of a compensating means incorporated directly in the amount itself and formed of an expansible metal of such size as to move the lens mount to properly focus the latter.

Yet another object of the invention is the provision of a compensating mechanism of the class described which is simple and rugged in construction, automatic, and highly effective in use.

To these and other ends, the invention resides in certain improvements and combinations of parts, all that will be hereinafter more fully described, the novel features being pointed out in the claims at the end of the specification.

In the drawings:

Fig. 1 is a longitudinal sectional view through a lens mount, showing a compensating mechanism constructed in accordance with the present invention and used in connection with a lens system, the focal length of which decreases with an increase in temperature;

Fig. 2 is a transverse sectional view taken through the mount illustrated in Fig. 1, and substantially on line 2—2 of the latter, showing the arrangement of the various parts of the lens mount and the compensating means;

Fig. 3 is a view similar to Fig. 1, showing a modified compensating means for use with a lens system, the focal length of which increases with increased temperature; and Fig. 4 is a transverse sectional view taken through the mount illustrated in Fig. 3 and substantially on line 4—4 thereof, showing the various parts.

Similar reference numerals throughout the various views indicate the same parts.

As a camera and lens system are subjected to temperature variations, certain errors are introduced and these errors are:

1. A change in the spacing of the lens cells or the lens element;
2. A change in the curvatures of the lens elements; and
3. A change in the dimensions of the camera body or camera parts.

As mentioned above, with small cameras used under normal conditions, these errors are not serious and need not be compensated for. However, in aerial cameras, proper consideration must be given to such errors and proper correction or adjustments made; otherwise, the results will not be as expected. The compensating means of the present invention is used with a sleeve or member having a negligible coefficient of expansion, such as an alloy known as "Invar" which has a composition of about 63% iron and 37% nickel and a coefficient of expansion of $0.8 \times 10^6$. This "Invar" sleeve is connected to the lens system and, in turn, is connected to the one end of a compensating expansible member, such as a magnesium sleeve, the other end of which is anchored to the camera body or housing. Inasmuch as "Invar" is practically not affected by temperature, all expansion and contraction takes place in the magnesium sleeve. The length of this sleeve is calculated to exactly compensate for the expansion or contraction of the camera, together with the changes contributed by the various lens elements and mounts when affected by temperature. Also the expansion or contraction of the magnesium sleeve is such as to move the lens element or lens system both the proper amount and the correct direction to maintain the system in focus under the particular temperature conditions encountered, the advantage of which will be readily apparent to those in the art.

Figs. 1 and 2 show the application of the focusing compensating means of the present invention as applied to a lens mount in which is positioned lens system, the focal length of which decreases upon an increase in temperature so that as the temperature increased the lens system must be pulled back toward the focal plane, or to the right as viewed in Fig. 1, the focal plane being shown at 10. The mount has a front lens cell 11 in which are positioned lenses 12 and 13, and which is connected to the rear lens cell 14 by a connecting member 15. Screws 16 serve to releasably connect the front cell to the connector 15. The rear lens cell 14 has positioned therein lens elements 17 and 18. The two cells 11 and 14 and the connector 15 thus form a single lens tube in which the lens system is mounted. The rear cell 14 is threaded at 20 so that it may engage a similar threaded portion on a tube 21 formed with a radial plate 22 which connects tube 21 to a sleeve 23 spaced from but concentric with the tube 21. A second sleeve 24 is spaced outwardly from but is concentric with the sleeve 23 and has the rear end formed with an upturn flange 25 which is rigidly anchored to a portion 26 of the camera by screws 27 or other fastening means. The front end of the outer sleeve 24 is turned down to provide an annular flange 28 which closely approaches the front end of the inner sleeve 23, and which cooperates with an upturn annular flange 29 formed on the rear end of the sleeve 23 to provide an annular space or channel in which is positioned an expansible member in the form of a sleeve 30 made of magnesium. Screws 31 extend through the flanges 28 and 29 to connect the opposite ends of the sleeves 23 and 24 to the magnesium spacing sleeve 30, as clearly shown in Fig. 1.

Thus, the rear end of the outer sleeve 24 is securely anchored to the camera while the front end is attached to the front end of expansible sleeve 30. The inner sleeve 23, on the other hand, is connected to the rear end of the sleeve 30 and is also connected to the lens cells 11 and 14. Sleeves 23 and 24 are thus connected by and through the expansible magnesium sleeve 30. However, the sleeves 23 and 24 are formed of "Invar" so that they will not change materially in length due to temperature changes. On the other hand, the magnesium sleeve 30 has a high coefficient of expansion and will change its length or axial dimension considerably with changes in temperature. For example, when the temperature rises, the sleeves 23 and 24 will not be affected, but the axial dimensions of the magnesium sleeve 30 will increase. However, as the front end of sleeve 30 is anchored to the front end of the outer "Invar" sleeve 24, expansion of the sleeve 30 must be rearwardly or to the right, as viewed in Fig. 1. Such rightward expansion will carry the inner "Invar" sleeve 23 and the lens cells 11 and 14 to the right or toward the focal plane 10 to decrease the distance between the lens system and the focal plane to compensate for the decrease in the focal length of the system because of increase in temperature. Thus, the expansible sleeve 30 serves to automatically move the lens cells 11 and 14 rearwardly upon an increase in temperature. A decrease in temperature, on the other hand, will cause an axial shortening of the sleeve 30, and this shortening will move the inner sleeve 23 and the cells 11 and 14 forwardly away from the focal plane, as is required.

Thus, the use of the expansible magnesium sleeve 30, which is incorporated in the lens mount itself, serves to move the cells 11 and 14 to compensate automatically for variation in the focal length of the system due to temperature changes. Furthermore, the arrangement of sleeves 23 and 24 and 30 is such that the lens system moves in the correct direction as well as the proper amount to always maintain a system in focus irrespective of the temperature conditions encountered. The result is that the operator need not consider any temperature change, nor will he have to make any adjustments of the lens system to compensate for temperature change since such lens adjustment is made automatically.

Figs. 3 and 4 show a modified arrangement of the compensating mechanism of the present invention adapted for use in connection with a lens system, the focal length of which increases upon an increase in temperature. With such an arrangement, the lens system must move forwardly or away from the focal plane 19 as the temperature increases rather than toward the focal plane, as in the arrangement shown in Figs. 1 and 2, as above described. Parts of Figs. 3 and 4 which correspond with those in Fig. 1 and Fig. 2 will be designated by the same numerals.

The modified structure illustrated in Figs. 3 and 4 is similar to that shown in Figs. 1 and 2 in that the sleeve 23ª, like sleeve 23, is connected to the lens cells, while the magnesium sleeve 30 surrounds the sleeve 23ª. In the modified arrangement, however, it is necessary to move the lens cells 11 and 14 forwardly or to the left, as shown in Fig. 3, upon an increase in temperature. To secure this result, the rear end 35 of magnesium sleeve 30 is anchored by screws 36 to the camera body 26. Thus, any expansion or contraction of sleeve 30 will be forward. The "Invar" sleeve 23ª, connected to the lens cells, is secured by screws 37 to the front end of the expansion sleeve 30. Thus, forward movement of the sleeve 30, with increased temperatures, will also serve to carry sleeve 23ª and the lens cell forwardly to increase the focal length of the system, as is required. The sleeve 30 is so designed as to move the lens cells the proper distance and direction for each increment of temperature increase to maintain the system in focus.

While certain embodiments of the invention are disclosed, it is to be understood that the inventive idea may be carried out in a number of ways. This application is, therefore, not to be limited to the precise details described, but is intended to cover all variations and modifications thereof which fall within the scope of the appended claims.

We claim:

1. In a camera, the combination with a focal plane, a lens tube spaced axially from said plane and having mounted therein a plurality of lens elements which constitute a lens system the focal length of which varies with temperature changes, of means for axially moving said tube to move said elements as a unit to alter the position of said system relative to said plane to compensate for said variation, said means comprising an axially expansible sleeve, means for anchoring one end of said sleeve to said camera, and means for operatively connecting the other end of said sleeve to said tube so that as the axial dimension of said sleeve varies due to temperature changes the tube will be moved axially to position said system to compensate for the variation in the focal length of said system.

2. In a camera, the combination with a focal plane, a lens cell spaced axially from said plane and having mounted therein a lens element the focal length of which varies with temperature changes, of means for moving said cell axially in one direction relative to said plane upon an increase in temperature to alter the axial position of said element to compensate for said increase, said means comprising an axially expansible sleeve concentric with said cell, means for anchoring to said camera the end of said sleeve opposite to the direction of movement of said cell so that the axial expansion of said sleeve will be in the same direction as the cell must be moved, and means for connecting the free end of said sleeve to said cell so that as said sleeve expands axially due to temperature changes the cell will be moved automatically relative to said plane in the proper direction to position said system axially to compensate for the change in the focal length.

3. In a camera, the combination with a focal plane, a lens cell spaced axially from said plane and having mounted therein a lens system the focal length of which varies with temperature changes, of means for axially moving said cell to alter the position of said system relative to said plane to compensate for said variation, said means comprising a sleeve concentric with said cell and formed of magnesium, means for anchoring one end of said sleeve so that the axial dimensional variations due to temperature changes will be in the same direction as and an amount equal to that which the cell must be moved, and means for operatively connecting the other end of said sleeve to said cell so that as the sleeve length varies due to temperature changes the cell will be moved in the proper direction and distance to position the system accurately to compensate for its variation in focal length due to said temperature change.

4. In a camera, the combination with a focal plane, a lens cell having mounted therein a lens element the focal length of which decreases upon increase in temperature, of means for axially moving said cell rearwardly upon an increase in temperature to alter the position of said element relative to said plane to compensate for said increase, said means comprising an axially expansible member, means for anchoring the front end of said sleeve against axial movement so that said sleeve is free to expand rearwardly only, and means for operatively connecting the rear end of said sleeve to said cell so that as said sleeve expands rearwardly due to a temperature increase the element will be similarly moved, the length of said sleeve being such that the amount of rearward movement of said element will be sufficient to compensate for the decrease in the focal length of the element due to the temperature increase.

5. In a camera, the combination with a focal plane, a lens cell having mounted therein a lens element the focal length of which decreases upon increase in temperature, of means for axially moving said cell rearwardly upon an increase in temperature to alter the position of said element relative to said plane to compensate for said increase, said means comprising a pair of concentric sleeves formed of a material having a negligible expansion coefficient, a sleeve of an expansible material positioned between and concentric with said pair of sleeves, means for anchoring the rear end of said outer sleeve, means for connecting the front end of the inner sleeve to said cell, and means for connecting the opposite ends of said expansible sleeve to said pair of sleeves so that said inner sleeve will move rearwardly as a unit with said expansible sleeve upon an increase in temperature to move said cell rearwardly to position said element to compensate for its change in focal length due to the temperature increase.

6. In a camera, the combination with a focal plane, a plurality of lens elements the focal length of which decreases with a temperature increase, of a plurality of lens cells in which said elements are mounted, each of said cells being spaced axially from said plane and formed of a material which changes in axial dimension with temperature changes so as to vary the spacing of said elements, a pair of concentric sleeves formed of a material having a substantial negligible coefficient of expansion, a sleeve of expansible material positioned between and concentric with said pair of sleeves, means for anchoring the rear end of the outer of said pair of sleeves to said camera, means for connecting the front end of the inner of said pair of sleeves to said cells, and means for connecting the front and rear ends respectively of said expansible sleeve to said pair of sleeves so that said inner sleeve and said cells will move rearwardly as a unit upon expansion of said expansible sleeve with an increase in temperature to move said elements rearwardly relative to said plane to a position to compensate for the change in their focal length by a temperature increase.

7. In a camera, the combination with a focal plane, a plurality of lens elements the focal length of which decreases with an increase in temperature, of a plurality of lens cells in which said elements are mounted, said cells being spaced axially from said plane and formed of magnesium which expands upon an increase in temperature to vary the spacing of said elements, a pair of concentric sleeves formed of a material having a negligible coefficient of expansion, means for anchoring the rear end of the outer of said sleeves to said camera, means for operatively connecting the front end of the inner of said sleeves to said cells, a sleeve formed of magnesium positioned between and concentric with said pair of sleeves, and means for connecting the front end of said magnesium sleeve to the front end of the outer sleeve and the rear end to the rear of said inner sleeve so that an expansion of said magnesium sleeve due to a temperature increase will move said inner sleeve and said cells rearwardly toward and relative to said focal plane a distance sufficient to compensate for the change in the focal length of said elements due to the temperature increase.

8. In a camera, the combination with a focal plane, a lens system the focal length of which increases with an increase in temperature, of means for moving said system forward and relative to said plane to increase said focal length automatically upon a rise in temperature, said means comprising a member having a negligible coefficient of expansion directly connected to said lens system, an expansible sleeve positioned adjacent said member, means for anchoring the rear end of said sleeve to said camera so that said sleeve will increase in length forwardly upon an increase in temperature, and means for connecting said member to said sleeve to move said system forwardly to increase its focal length upon the expansion of said sleeve.

9. In a camera, the combination with a focal plane, a lens system the focal length of which increases with an increase in temperature, of means for moving said system forward and relative to said plane to increase said focal length automatically upon a rise in temperature, said means comprising a sleeve formed of a material with a substantially negligible coefficient of expansion, means for connecting said sleeve to said system, a second sleeve formed of magnesium, means for anchoring the rear end of said second sleeve to said camera so that any expansion of said sleeve will be in a forward direction, and means for connecting said first sleeve to the front end of said second sleeve so that any expansion of the latter will move said lens system forwardly to alter its focal length to compensate for the temperature increase.

10. A lens mount having positioned therein a plurality of lens elements constituting a lens system the focal length of which changes with temperature variations, of means incorporated within the mount for adjusting the axial position of such system to move said elements as a unit to compensate for said variation, said means comprising an expansible member the axial dimension of which changes with temperature, and means for connecting said member to said system to move all the elements as a unit the latter in one direction the proper amount and direction to position said system to compensate for said variation without altering the axial spacing of said elements.

11. A lens mount having positioned therein a plurality of lens elements constituting a lens system the focal length of which changes with temperature variations, of a member having a negligible coefficient of expansion, means for connecting one end of said member to said system, an expansible sleeve the axial dimension of which changes with temperature variations, means to anchor one end of said sleeve and means for connecting the other end of said sleeve to the other end of said member so that the entire system will be moved axially as a unit to compensate for said change in focal length without changing the axial spacing of said elements.

12. A lens mount having positioned therein a plurality of lens elements constituting a lens system the focal length of which changes with temperature variations, of means incorporated within the mount for adjusting the axial position of such system as a whole to compensate for said variation, said means comprising an expansible member the axial dimension of which changes with temperature, said member being adapted to have one end thereof anchored so that it will change its axial dimension only in the direction which said system must be moved, and means for connecting said system to the other end of said member so as to move as a unit therewith to position said system accurately and automatically to compensate for said change in focal length to compensate for temperature variations without altering the axial spacing of said elements.

13. A lens mount having positioned therein a plurality of lens elements constituting a lens system the focal length of which changes with temperature variations, of a sleeve member of a negligible coefficient of expansion having one end thereof connected to said system, a sleeve member formed of magnesium adapted to have one end anchored so that it is free to change its axial dimension only in the direction which said system must be moved, and means for connecting the other end of said first sleeve member to the other end of said magnesium sleeve so that said system will be moved in said direction to compensate for temperature variations without altering the axial spacing of said elements.

CHARLES M. LEE.
GORDON L. BARRINGER.

REFERENCES CITED

The following references are of record in the file of this patent:

UNITED STATES PATENTS

| Number | Name | Date |
|---|---|---|
| 1,325,936 | Fouasse | Dec. 23, 1919 |
| 2,219,224 | French | Oct. 22, 1940 |
| 2,234,707 | Ort | Mar. 11, 1941 |
| 2,240,827 | Bangert et al. | May 6, 1941 |
| 2,341,364 | Crumrine | Feb. 8, 1944 |
| 2,423,491 | Fairbank | July 8, 1947 |
| 2,423,492 | Fairbank | July 8, 1947 |